(12) United States Patent
Kageyama

(10) Patent No.: US 9,421,826 B2
(45) Date of Patent: Aug. 23, 2016

(54) PNEUMATIC TIRE

(71) Applicant: SUMITOMO RUBBER INDUSTRIES LTD., Kobe-shi, Hyogo (JP)

(72) Inventor: Naoki Kageyama, Kobe (JP)

(73) Assignee: SUMITOMO RUBBER INDUSTRIES LTD., Kobe-Shi (JP)

( * ) Notice: Subject to any disclaimer, the term of this patent is extended or adjusted under 35 U.S.C. 154(b) by 446 days.

(21) Appl. No.: 13/871,077

(22) Filed: Apr. 26, 2013

(65) Prior Publication Data

US 2013/0306208 A1 Nov. 21, 2013

(30) Foreign Application Priority Data

May 15, 2012 (JP) ................. 2012-111776

(51) Int. Cl.
 B60C 11/11 (2006.01)
 B60C 11/01 (2006.01)
 B60C 13/00 (2006.01)
 B60C 13/02 (2006.01)

(52) U.S. Cl.
 CPC ............... *B60C 11/01* (2013.01); *B60C 13/02* (2013.01)

(58) Field of Classification Search
 CPC ...................................... B60C 11/01
 See application file for complete search history.

(56) References Cited

U.S. PATENT DOCUMENTS

2006/0086445 A1 4/2006 Kishida
2009/0277550 A1* 11/2009 Ikeda ................. 152/209.18

FOREIGN PATENT DOCUMENTS

| EP | 2088007 A1 | * | 8/2009 | ............ B60C 11/01 |
| JP | 06092110 A | * | 4/1994 | |
| JP | 2005104385 A | * | 4/2005 | |
| JP | 2006-123647 A | | 5/2006 | |

OTHER PUBLICATIONS

Machine Translation: EP 2088007 A1; Behr et al.; no date.*
Machine Translation: JP 2005104385 A; Ohashi, Toshiyuki; no date.*
Machine Translation: JP 06092110 A; Teramoto, Kazuo; no date.*

* cited by examiner

*Primary Examiner* — Steven D Maki
*Assistant Examiner* — Kendra Ly
(74) *Attorney, Agent, or Firm* — Birch, Stewart, Kolasch & Birch, LLP

(57) ABSTRACT

A pneumatic tire has a tread portion having a tread surface between tread edges and provided along each tread edge with a row of shoulder blocks. Each of the shoulder blocks in at least one row is provided with at least one sipe extending at an angle of not less than 60 degrees with respect to the tire circumferential direction and having a plane inclined with respect to a normal direction to the tread surface. A chamfered part has a surface being arc-shaped in a tire meridian section and smoothly connecting between the tread surface and a surface of a buttress part. At least one protruding part has an upper surface protruding axially outwardly from the surface of the chamfered part and a side surface extending radially inwardly from an axially outer end of the upper surface. The protruding part has a circumferential width of from 0.5 to 7.0 mm.

7 Claims, 4 Drawing Sheets

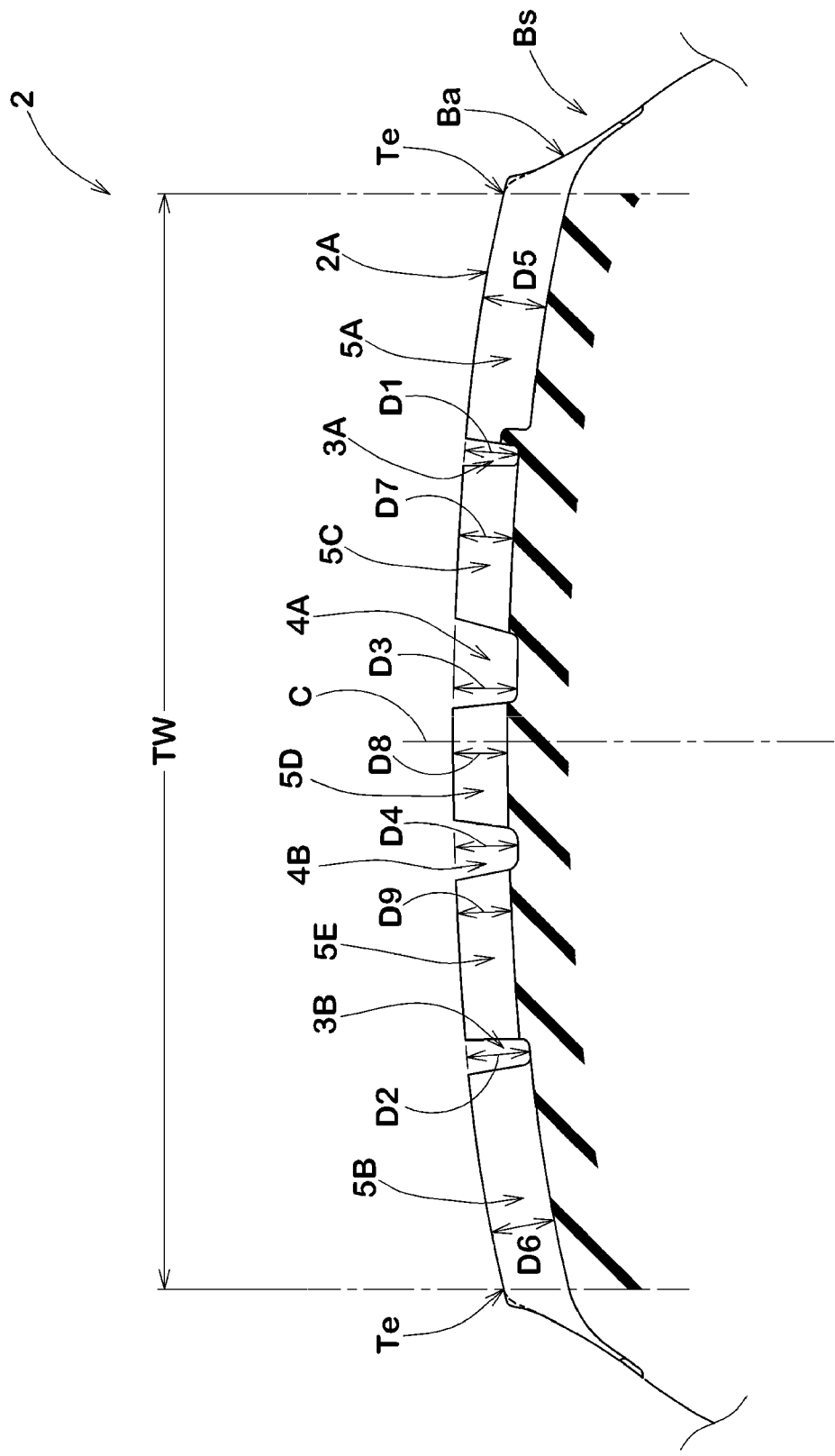

PNEUMATIC TIRE

BACKGROUND OF THE INVENTION

The present invention relates to a pneumatic tire, more particularly to a tread pattern suitable for studless tires, comprising shoulder blocks provided with at least one protruding part capable of improving cornering performance and behavior in critical cornering on snowy/icy roads.

Pneumatic tire improved in running performance on snowy/icy roads and steering stability on dry roads are always desired.

It has been known to increase rigidity of land portions of the tread portion of a tire on the inside of a vehicle rather than on the outside of the vehicle in order to improve cornering performance on snowy/icy roads and dry roads.
Also it has been known to provide for such tread portion with
sipes extending in tire axial directions as well as sipes disposed near the tread edges to extend in the tire circumferential direction, or
a so called square shoulder in which an angled corner is formed between the tread surface and sidewall surface in order to increase the edge effect in the tire axial direction and thereby to further improve the cornering performance on snowy/icy roads.

In such tires, however, there is a problem such that, during cornering on a snowy/icy road, when exceeds a critical cornering speed, a sudden side skid is very liable to occur, and if once such side skid occurs, it is difficult to get road grip again in a short time, and the critical behavior becomes unstable.

SUMMARY OF THE INVENTION

It is therefore, an object of the present invention to provide a pneumatic tire, in which the critical behavior in critical cornering on snowy/icy roads can be improved together with the cornering performance on snowy/icy roads and also dry pavements.

According to the present invention, a pneumatic tire comprising a tread portion having a tread surface between its tread edges and provided along each of the tread edges with a row of shoulder blocks, the shoulder blocks formed by a circumferentially continuously extending shoulder main groove disposed on each side of the tire equator as an axially outermost main groove and a plurality of shoulder lateral grooves extending from the shoulder main groove to the adjacent tread edge, wherein in at least one of the rows of the shoulder blocks, each of the shoulder blocks is provided with:

at least one sipe extending at an angle of not less than 60 degrees with respect to the tire circumferential direction and having a plane inclined with respect to a normal direction to the tread surface;

a chamfered part having a surface being arc-shaped in a tire meridian section and smoothly connecting between the tread surface and a surface of a buttress part; and at least one protruding part having an upper surface protruding axially outwardly from the surface of the chamfered part and a side surface extending radially inwardly from an axially outer end of the upper surface, and the protruding part has a circumferential width of from 0.5 to 7.0 mm.

Therefore, the sipes can increase the axial component of edges of the siped shoulder blocks, while maintaining necessary rigidity for the shoulder blocks. As a result, cornering performance on snowy/icy roads and straight running stability on dry roads can be improved.

The above-mentioned chamfered parts of the shoulder blocks can prevent unexpected occurrence of side skid, therefore, the behavior of the vehicle in critical cornering and cornering performance on snowy/icy roads may be improved.

In the initial stage of the occurrence of side skid, the protruding parts can provide traction. As a result, it becomes possible to get road grip again in a short time. Therefore, the improvement in the critical behavior snowy/icy roads may be furthered.

Thus, the pneumatic tire according to the present invention is improved in the cornering performance and the critical behavior on snowy/icy roads in a well balanced manner.

Preferably, the protruding part is provided with a chamfered part smoothly connecting between its upper surface and side surface so that the chamfered part has a radius Rb of curvature less than a radius Ra of curvature of the chamfered part of the buttress.

Preferably, the above-mentioned at least one protruding part is a plurality of protruding parts arranged at a pitch of from 2 to 10 mm in the tire circumferential direction.

Each of the shoulder blocks is preferably provided with a longitudinal sipe, as an axially outermost sipe, extending at an angle of not more than 10 degrees with respect to the tire circumferential direction.

In the following description, various dimensions, positions and the like refer to those under a normally inflated unloaded condition of the tire unless otherwise noted.

The ground contacting width TW is the axial distance between the tread edges Te measured in the under-mentioned normally inflated unloaded condition of the tire.

The tread edges Te are the axial outermost edges of the ground contacting region of the tire at camber angle of 0 degree under a normally inflated loaded condition.

The normally inflated unloaded condition is such that the tire is mounted on a standard wheel rim and inflate to a standard pressure but loaded with no tire load.

The normally inflated loaded condition is such that the tire is mounted on the standard wheel rim and inflate to the standard pressure and loaded with the standard tire load.

The standard wheel rim is a wheel rim officially approved or recommended for the tire by standard organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

BRIEF DESCRIPTION OF THE DRAWINGS

FIG. 2 is a cross sectional view of the tread portion thereof taken along line X-X of FIG. 1.

DESCRIPTION OF THE PREFERRED EMBODIMENTS

Embodiments of the present invention will now be described in detail in conjunction with the accompanying drawings.

The pneumatic tire according to the present invention comprises, as usual, a tread portion 2, a pair of axially spaced bead portions each with a bead core therein, a pair of sidewall portions extending between the tread edges Te and the bead portions, a carcass extending between the bead portions, and a tread reinforcing belt disposed radially outside the carcass in the tread portion 2.

The pneumatic tire as an embodiment of the present invention is designed as a tire for passenger cars.

Figure 1:
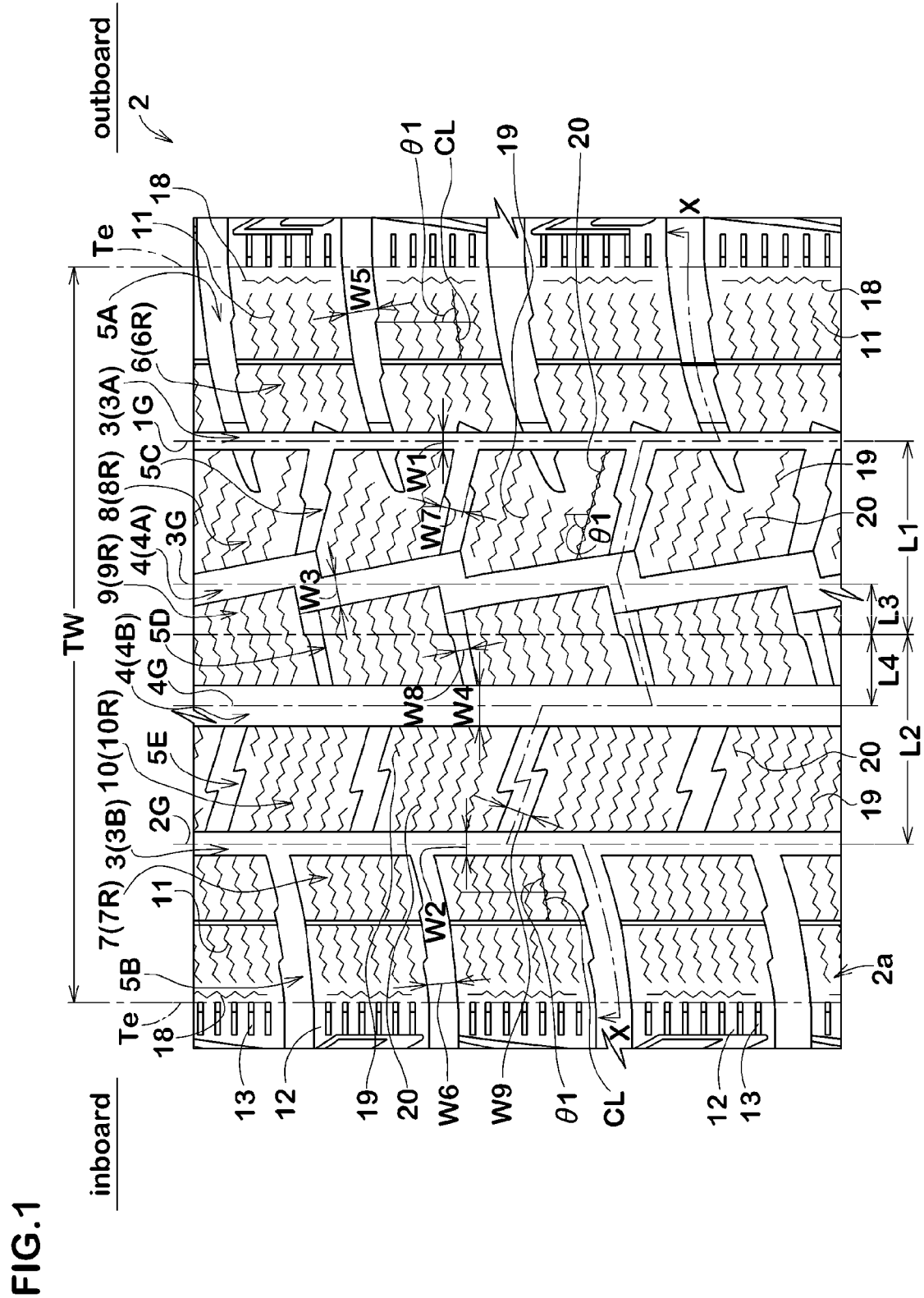
FIG. 1 is a developed partial plan view of a pneumatic tire as an embodiment of the present invention showing an asymmetric tread pattern.

The tread portion 2 is provided with tread grooves defining a tread pattern as shown in FIG. 1. The tread pattern is asymmetric about the tire equator C. But, in this embodiment, the tire is non directional (or bidirectional). The outboard sidewall portion to be located on the outside of the vehicle is provided with an indication such as "outside", and the inboard sidewall portion to be located on the inside of the vehicle is provided with an indication such as "inside".

The tread grooves include main grooves extending continuously in the tire circumferential direction, and lateral grooves intersecting with the main grooves.

Usually, the number of the main grooves is three to six. In this embodiment, the number of the main grooves is four.

The main grooves in this embodiment are: a pair of axially outermost shoulder main grooves 3; and a pair of crown main grooves 4 between the shoulder main grooves 3. The axially outermost shoulder main grooves 3 are: an outboard shoulder main groove 3A as the outboardmost main groove; and an inboard shoulder main groove 3B as the inboardmost main groove. The crown main grooves 4 are: an outboard crown main groove 4A between the outboard shoulder main groove 3A and the tire equator C; and an inboard crown main groove 4B between the inboard shoulder main groove 3B and the tire equator C.

The lateral grooves in this embodiment are: a plurality of outboard shoulder lateral grooves 5A extending from the outboard shoulder main groove 3A to the outboard tread edge Te; a plurality of inboard shoulder lateral grooves 5B extending from the inboard shoulder main groove 3B to the inboard tread edge Te; a plurality of outboard middle lateral grooves 5C extending from the outboard shoulder main groove 3A to the outboard crown main groove 4A; a plurality of center lateral grooves 5D extending between the outboard crown main groove 4A and the inboard crown main groove 4B; and a plurality of inboard middle lateral grooves 5E extending from the inboard crown main groove 4B to the inboard shoulder main groove 3B.

Therefore, the tread portion 2 in this embodiment has five block rows which are: a row 6R of circumferentially arranged outboard shoulder blocks 6 defined by the outboard shoulder main groove 3A, the outboard tread edge Te and the outboard shoulder lateral grooves 5A; a row 7R of circumferentially arranged inboard shoulder blocks 7 defined by the inboard shoulder main groove 3B, inboard tread edge Te and the inboard shoulder lateral grooves 5B; a row 8R of circumferentially arranged outboard middle blocks 8 defined by the outboard shoulder main groove 3A, the outboard crown main groove 4A and the outboard middle lateral grooves 5C; a row 9R of circumferentially arranged center blocks 9 defined by the outboard crown main groove 4A, inboard crown main groove 4B and the center lateral grooves 5D; and a row 10R of circumferentially arranged inboard middle blocks 10 defined by the inboard shoulder main groove 3B, the inboard crown main groove 4B and the inboard middle lateral grooves 5E.

The outboard shoulder main groove 3A, the inboard shoulder main groove 3B and the inboard crown main groove 4B are each formed as a straight groove to enhance the drainage as well as the self-ejecting of snow packed into the grooves. The outboard crown main groove 4A is on the other hand, formed as a zigzag groove to increase grip during running on snowy/icy roads.

In order to effectively derive these functions, the groove widths W1, W2, W3 and W4 of the main grooves 3A, 3B, 4A and 4B, respectively, are preferably set in a range of not less than 1.2%, more preferably not less than 1.5%, but not more than 6.7%, more preferably not more than 6.5% of the tread width TW. And the depths D1, D2, D3 and D4 of the main grooves 3A, 3B, 4A and 4B, respectively, are preferably set in a range of not less than 6.5 mm, more preferably not less than 7.5 mm, but not more than 13.0 mm, more preferably not more than 12.5 mm.

In order to improve cornering performance by increasing rigidity of the outboard shoulder blocks 6 and the inboard shoulder blocks 7 which are applied by a large load during cornering, the axial distance L1 from the tire equator C to the center line 1G of the outboard shoulder main groove 3A is preferably set in a range of not less than 22.5%, but not more than 30.5% of the tread width TW. And the axial distance L2 from the tire equator C to the center line 2G of the inboard shoulder main groove 3B is preferably set in a range of not less than 24.5%, but not more than 32.5% of the tread width TW.

In addition, in order to improve straight running stability by increasing rigidity of the center blocks 9 in the tire circumferential direction, the axial distance L3 from the tire equator C to the center line 3G (amplitude center line of zigzag) of the outboard crown main groove 4A is preferably set in a range of not less than 4.5%, but not more than 10.5% of the tread width TW. And the axial distance L4 from the tire equator C to the center line 4G of the inboard crown main groove 4B is preferably set in a range of not less than 6.5%, but not more than 12.5% of the tread width TW.

The lateral grooves 5A, 5B, 5C, 5D and 5E are inclined with respect to the tire axial direction in multi-directions in order that their groove edges improve the cornering performance on snowy/icy roads. In order to further improve the cornering performance on snowy/icy roads, each of the lateral grooves 5A, 5B, 5C, 5D and 5E has groove edges at least one of which is zigzag.

In order to effectively derive the above functions, the groove widths W5, W6, W7, W8 and W9 of the lateral grooves 5A, 5B, 5C, 5D and 5E are preferably set in a range of not less than 6.5 mm, more preferably not less than 7.5 mm, but not more than 13.0 mm, more preferably not more than 12.5 mm. And the depths D5, D6, D7, D8 and D9 of the lateral grooves 5A, 5B, 5C, 5D and 5E are preferably set in a range of not less than 6.5 mm, more preferably not less than 7.5 mm, but not more than 13.0 mm, more preferably not more than 12.5 mm.

In order to further enhance the drainage as well as the self-ejecting of snow packed into the grooves during cornering, the depths D5 and D6 of the lateral grooves 5A and 5B are larger than the depths D7, D8 and D9 of the lateral grooves 5C, 5D and 5E.

In this embodiment, in at least one of the rows of the outboard shoulder blocks 6, each of the shoulder blocks 6 is provided with at least one sipe 11 extending at an angle θ1 of not less than 60 degrees with respect to the tire circumferential direction. Therefore, the sipes 11 can increase the axial component of edges of the siped the outboard shoulder blocks 6, while maintaining necessary rigidity for the outboard shoulder blocks 6. As a result, cornering performance on snowy/icy roads and straight running stability on dry roads can be improved.

If the angle θ1 is closer to 90 degrees with respect to the tire circumferential direction, then the circumferential component of the edges becomes small, and there is a possibility that the cornering performance on snowy/icy roads is deteriorated. If the angle θ1 is less than 60 degrees with respect to the tire circumferential direction, then the axial component of edges becomes small, and there is a possibility that straight running stability on snowy/icy roads is deteriorated. Preferably, the angle θ1 is not less than 70 degrees, more preferably not less than 86 degrees, but not more than 86 degrees, more preferably not more than 82 degrees with respect to the tire circumferential direction. In this embodiment, the sipes 11 is zigzag sipes. In the case of the zigzag sipes 11, the above-mentioned angle θ1 is that of the amplitude center line CL of zigzag of the sipe.

It is desirable that the opposed side walls of the sipes 11 each have multiple surfaces inclined with respect to a normal direction to the tread surface 2a as disclosed in U.S. Pat. No. 6,907,910 or European Patent No. 1277599B1 or Japanese Patent No. 3648179. Therefore, the opposed side walls can engage with each other, and the block's parts on both side of the sipe unite with each other to increase the apparent block rigidity. As a result, the cornering performance on snowy/icy roads and dry pavements can be improved. Aside from such zigzag sipe, it is also possible to use a smoothly curved zigzag sipe as the sipe 11.

In order to effectively derive the above functions, the depths of the sipes 11 are preferably set in a range of not less than 37%, more preferably not less than 43%, but not more than 85%, more preferably not more than 74% of the depth D5 of the lateral groove 5A.

In order to further effectively derive the above functions, each of the outboard shoulder blocks 6 in this embodiment is preferably provided with five to seven sipes 11 arranged in the tire circumferential direction. The number of such sipes 11 is however, may vary depending on the sipe of the outboard shoulder block 6.

Figure 3A:
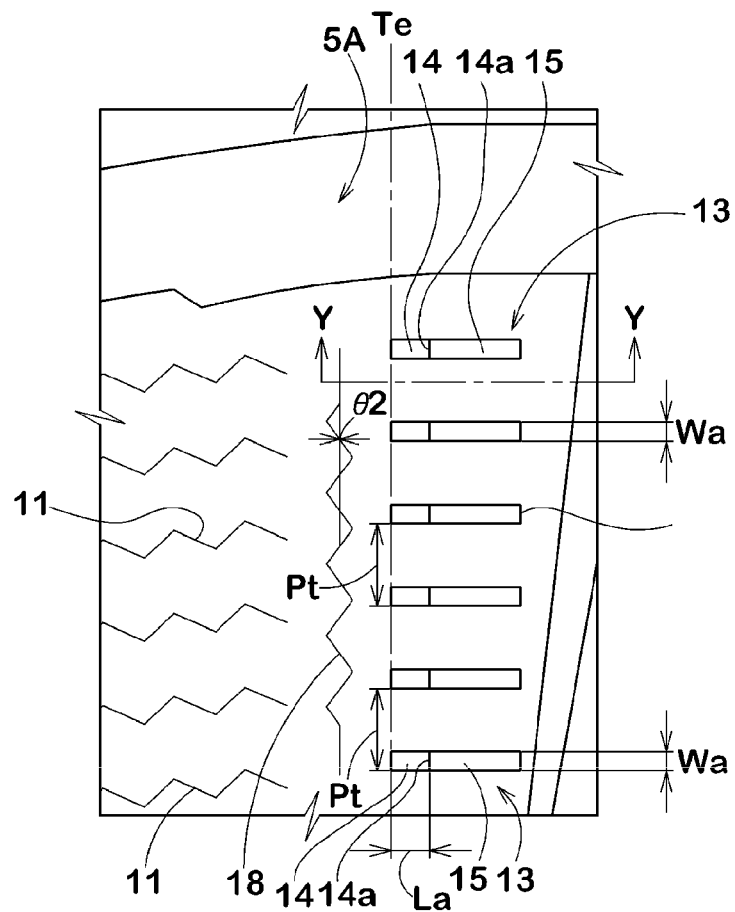
FIG. 3(a) is an enlarged plan view of the outboard shoulder block in FIG. 1.
Figure 3B:
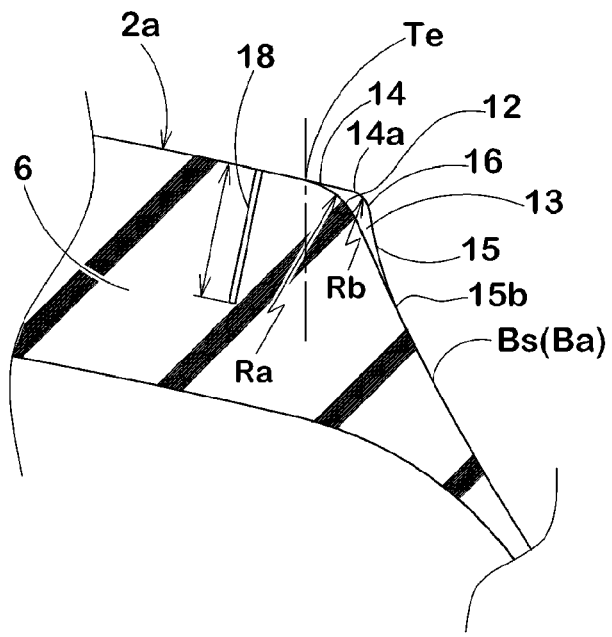
FIG. 3(b) is a cross sectional view taken along line Y-Y of FIG. 3(a).
Figure 4:
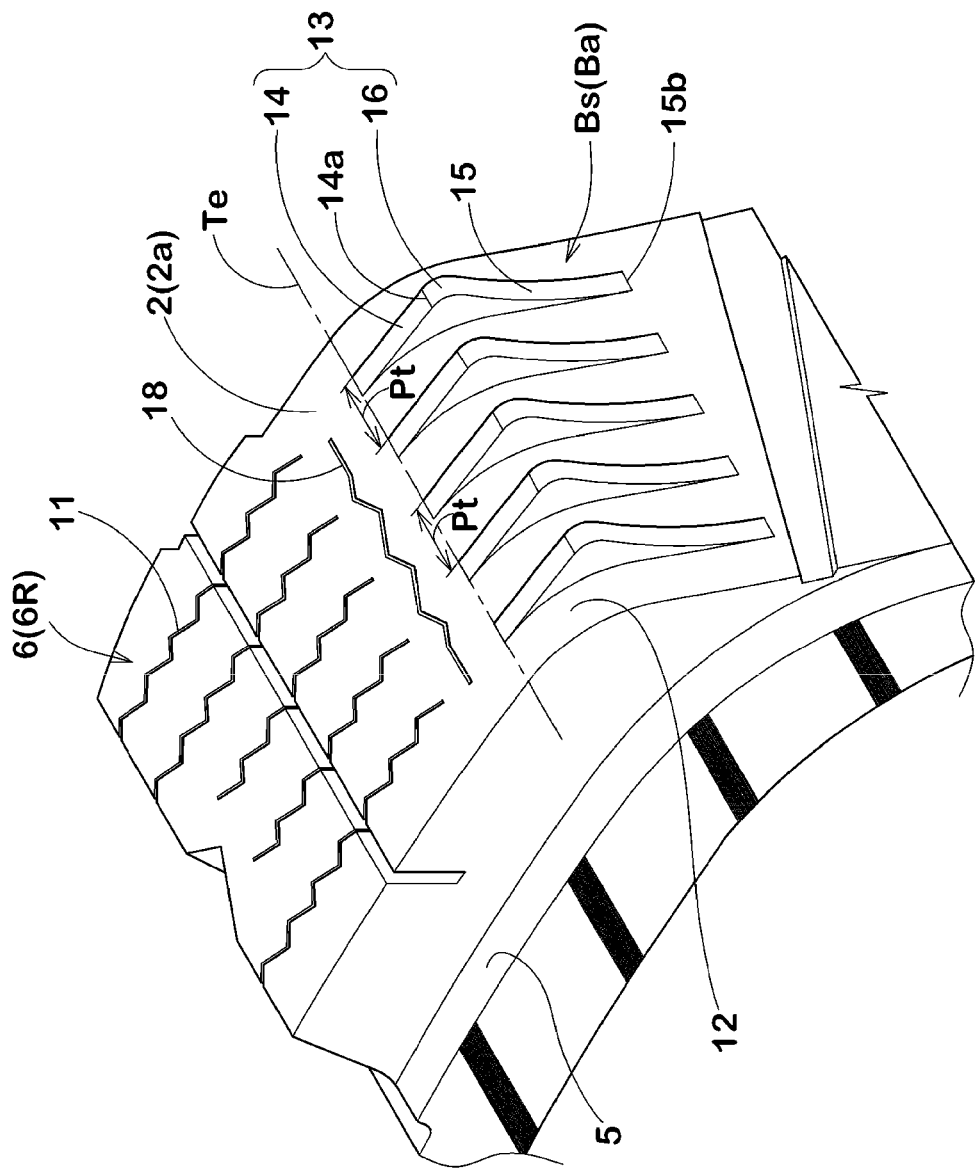
FIG. 4 is a perspective view of the protruding parts.

As shown in FIG. 3(b) and FIG. 4, the outboard shoulder block 6 has a chamfered part 12 having a surface being arc-shaped in a tire meridian section and smoothly connecting between the tread surface 2a and a surface Ba of a buttress part Bs.

When initiating a turn, the outboard shoulder blocks 6 positioned on the outside of the turn are gradually increased in the ground contacting area owing to the chamfered parts 12, therefore, unexpected occurrence of side skid can be prevented. As a result, the behavior of the vehicle in critical cornering and cornering performance on snowy/icy roads may be improved.

If the radius Ra of curvature of the chamfered part 12 is too large, there is a possibility that the straight running stability and the cornering performance on snowy/icy roads is deteriorated. If the radius Ra of curvature is too small, then there is a possibility that the behavior of the vehicle in critical cornering and cornering performance on snowy/icy roads is not improved. Preferably, the radius Ra of curvature is not less than 0.5 mm, more preferably not less than 1.0 mm, but not more than 8.0 mm, more preferably not more than 6.0 mm.

The outboard shoulder block 6 has at least one protruding part 13 having an upper surface 14 protruding axially outwardly from the surface of the chamfered part 12 and a side surface 15 extending radially inwardly from an axially outer end 14a of the upper surface 14. The protruding part 13 can increases the ground contacting area of the outboard shoulder block 6 during cornering and the rigidity of the outboard shoulder block 6 is reduced in the protruding part 13. As a result, unexpected occurrence of side skid can be prevented. In the initial stage of the occurrence of side skid, the protruding parts 13 can provide traction. As a result, it becomes possible to get road grip again in a short time. Therefore, the improvement in the critical behavior snowy/icy roads may be furthered.

The upper surface 14 of the protruding part 13 in this embodiment merges in the tread surface 2a in the vicinity of the outboard tread edge Te.

In order to effectively derive the above functions, the axial distance La from the outboard tread edge Te to the axially outer end 14a of the upper surface 14 is preferably not less than 0.5 mm, more preferably not less than 1.6 mm, but not more than 4.0 mm, more preferably not more than 2.6 mm.

The radially inner end 15b of the side surface 15 in this embodiment merges in the surface Ba of the buttress part Bs in order to improve the durability of the protruding part 13.

The circumferential width Wa of the protruding part 13 is set in range of from 0.5 mm to 7.0 mm.

If less than 0.5 mm, it is difficult to increase the ground contacting area of the outboard shoulder blocks 6 during cornering, and there is a possibility that the behavior of the vehicle in critical cornering on snowy/icy roads is not improved. If more than 7.0 mm, the outboard shoulder blocks 6 near the outboard tread edge Te can not be softened, and there is a possibility that unexpected occurrence of side skid is not prevented. Preferably, the circumferential width Wa is not less than 0.7 mm, but not more than 2.0 mm.

The protruding part 13 in this embodiment is provided with a chamfered part 16 being arc-shaped in a tire meridian section and smoothly connecting between the upper surface 14 and the side surface 15 of the protruding part 13. As a result, the protruding part 13 smoothly comes into contact with the road, and unexpected occurrence of side skid is prevented. Further, in the initial stage of the occurrence of side skid, the protruding parts 13 can provide traction. Therefore, the improvement in the critical behavior snowy/icy roads may be more furthered.

In order to effectively derive the above functions, a radius Rb of curvature of the chamfered part 16 of the protruding part 13 is preferably less than the radius Ra of curvature of the chamfered part 12.

If the radius Rb of curvature minus the radius Ra of curvature is too small, then the protruding part 13 is become small, and there is a possibility that the above functions are not derived. If the radius Rb of curvature minus the radius Ra of curvature is too large, then the protruding part 13 does not smoothly comes into contact with the road, and there is a possibility that unexpected occurrence of side skid is not prevented. Preferably, the radius Rb of curvature minus the radius Ra of curvature is not less than 0.2 mm, more preferably not less than 0.5 mm, but not more than 2.8 mm, more preferably not more than 2.5 mm.

In order to more effectively derive the above functions, the outboard shoulder blocks 6 are each provided with a plurality of the protruding parts 13.

Preferably, the circumferential arrangement pitch Pt of the protruding parts 13 is not less than 2 mm, more preferably not less than 4 mm, but not more than 10 mm, more preferably not more than 8 mm.

Thus, since the outboard shoulder blocks 6 which receive a relatively large side force during cornering are provided with the sipes 11, the chamfered parts 12 and the protruding parts 13, the cornering performance and the critical behavior on snowy/icy roads can be improved in a well balanced manner.

In this embodiment, since the inboard shoulder blocks 7 are provided with the sipes 11, the chamfered parts 12 and the protruding parts 13, the above functions is further derived.

In this embodiment, each of the shoulder blocks 6 and 7 is provided with a longitudinal sipe 18, as an axially outermost sipe, extending at an angle θ2 of not more than 10 degrees with respect to the tire circumferential direction.

Since the longitudinal sipe 18 increases the circumferential component of the edges of the shoulder block, the cornering performance on icy roads is improved especially.

Preferably, the angle θ2 is not more than 5 degrees, more preferably not more than 3 degrees, most preferably not more than 0 degrees with respect to the tire circumferential direction.

In this embodiment, the longitudinal sipe 18 is a zigzag sipe. Thus, the longitudinal sipe 18 can further increases the circumferential component of the edges, and the cornering performance on icy roads is further improved.

In the case of the zigzag sipe, the angle θ2 is that of the amplitude center line of the zigzag of the sipe.

It is desirable that the opposed side walls of the longitudinal sipe 18 are parallel to the normal direction to the tread surface 2a. As a result, the rigidity of the outboard shoulder blocks 6 near the outboard tread edge Te is reduced, and the improvement in the critical behavior snowy/icy roads may be furthered.

It is however, also possible to form the longitudinal sipe 18 so that the opposed side walls have multiple surfaces as disclosed in U.S. Pat. No. 6,907,910 or European Patent No. 1277599B1 or Japanese Patent No. 3648179.

Both of the circumferential ends of the longitudinal sipe 18 are preferably closed within shoulder block. As a result, an excessive decrease in the rigidity of the outboard shoulder block can be prevented, and the cornering performance on dry roads can be improved.

The outboard middle blocks 8, the center blocks 9 and the inboard middle blocks 10 are provided with sipes 19 each having two opened ends and sipes 20 each having one closed end and one open end. Therefore, the edges of such blocks 8, 9 and 10 are increased, and the straight running stability and the cornering performance on snowy/icy roads may be improved. In order to more effectively derive the above functions and maintain the rigidity of the blocks 8, 9 and 10, the opposed side walls of the sipes 19 and 20 may be have multiple surfaces as disclosed in U.S. Pat. No. 6,907,910 or European Patent No. 1277599B1 or Japanese Patent No. 3648179.

Comparison Tests

Pneumatic tires of size 195/65R15 (rim size 15×6.0J) for passenger car were prepared and tested for the cornering performance and critical behavior in critical cornering on snowy/icy roads.

The tires had tread patterns based on the tread pattern shown in FIG. 1. The specifications thereof are shown in Table 1.

Common specifications are as follows.
    tread width TW: 163 mm
    outboard shoulder main groove depth D1: 7.7 mm
    inboard shoulder main groove depth D2: 9.0 mm
    outboard crown main groove depth D3: 9.0 mm
    inboard crown main groove depth D4: 7.7 mm
    outboard shoulder lateral grooves depth D5: 9.0 mm
    inboard shoulder lateral grooves depth D6: 9.0 mm
    outboard middle lateral grooves depth D7: 7.7 mm
    center lateral grooves depth D8: 7.7 mm
    inboard middle lateral groove depth D9: 7.7 mm
    circumferential sipe depth: 5.0-7.0 mm In the test, the test tires (tire pressure 200 kPa) were mounted on all wheels of a 2000 cc passenger car and run at a speed of 40 km/h on a snowy road and icy road in a tire test course and also on a dry pavement in a tire test course, and the test driver evaluated cornering performance based on the steering response, rigid feeling and the like when cornering.

Further, on the snowy and icy roads, the behavior of the tire in critical cornering, and the grip in cornering were evaluated by the test driver.

The test results are indicated by an index based on comparative tire Ref. 1 being 6, wherein the larger the index, the better the cornering performance. Incidentally, the index "6+" is better than the index "6". Further, the index "6" is better than the index "−6".

From the test results, it was confirmed that, according to the present invention, the critical behavior on snowy/icy roads, the grip in cornering and the cornering performance can be effectively improved. In addition, the same results could be obtained from similar tests made by changing the widths of the grooves 3-6 and the angles with respect to a radial direction, of the side walls of the grooves 3-6.

TABLE 1

| Tire | Ref. 1 | Ex. 1 | Ref. 2 | Ex. 2 | Ex. 3 | Ref. 3 | Ex. 4 | Ex. 5 |
|---|---|---|---|---|---|---|---|---|
| Width Wa (mm) | — | 1.2 | 0.4 | 0.5 | 7.0 | 7.2 | 1.2 | 1.2 |
| Radius Ra of curvature (mm) | 3.0 | 3.0 | 3.0 | 3.0 | 3.0 | 3.0 | 0.4 | 2.5 |
| Ra − Rb (mm) | — | 2.0 | 2.0 | 2.0 | 2.0 | 2.0 | 2.0 | 2.0 |
| Pitch Pt (mm) | — | 4.6 | 4.6 | 4.6 | 4.6 | 4.6 | 4.6 | 4.6 |
| Axial distance La (mm) | — | 2.1 | 2.1 | 2.1 | 2.1 | 2.1 | 2.1 | 2.1 |
| Cornering performance on dry pavement | 6.0 | 7.0 | 7.0 | 7.0 | 7.0 | 7.0 | 7.0 | 7.0 |
| Cornering performance on snowy road | 6.0 | 7.0 | 7.0 | 7.0 | 7.0 | 7.0 | 7.0 | 7.0 |
| Critical behavior on snowy road | 6.0 | 7.0 | 5.5+ | 6.5 | 6.5 | 5.5 | 6.0 | 7.0− |
| Cornering performance on icy road | 6.0 | 7.0 | 7.0 | 7.0 | 7.0+ | 7.0+ | 6.5 | 7.0 |
| Critical behavior on icy road | 6.0 | 7.0 | 5.5+ | 6.5 | 6.5 | 5.5 | 6.0 | 7.0− |

| Tire | Ex. 6 | Ex. 7 | Ex. 8 | Ex. 9 | Ex. 10 | Ex. 11 | Ex. 12 | Ex. 13 |
|---|---|---|---|---|---|---|---|---|
| Width Wa (mm) | 1.2 | 1.2 | 1.2 | 1.2 | 1.2 | 1.2 | 1.2 | 1.2 |
| Radius Ra of curvature (mm) | 3.5 | 8.5 | 3.0 | 3.0 | 3.0 | 3.0 | 3.0 | 3.0 |

TABLE 1-continued

| | | | | | | | | |
|---|---|---|---|---|---|---|---|---|
| Ra − Rb (mm) | 2.0 | 2.0 | 0.0 | 0.5 | 2.5 | 2.8 | 2.0 | 2.0 |
| Pitch Pt (mm) | 4.6 | 4.6 | 4.6 | 4.6 | 4.6 | 4.6 | 1.0 | 4.0 |
| Axial distance La (mm) | 2.1 | 2.1 | 2.1 | 2.1 | 2.1 | 2.1 | 2.1 | 2.1 |
| Cornering performance on dry pavement | 7.0 | 7.0 | 7.0 | 7.0 | 7.0 | 7.0 | 7.0− | 7.0− |
| Cornering performance on snowy road | 7.0 | 7.0 | 7.0 | 7.0 | 7.0 | 7.0 | 7.0 | 7.0 |
| Critical behavior on snowy road | 7.0− | 6.5 | 6.0− | 7.0− | 7.0− | 6.0+ | 6.5 | 7.0 |
| Cornering performance on icy road | 7.0 | 7.0− | 7.0 | 7.0 | 7.0 | 7.0 | 7.0 | 7.0 |
| Critical behavior on icy road | 7.0− | 6.5 | 6.0− | 6.5 | 7.0− | 6.5 | 6.5+ | 7.0− |

| Tire | Ex. 14 | Ex. 15 | Ex. 16 | Ex. 17 | Ex. 18 | Ex. 19 |
|---|---|---|---|---|---|---|
| Width Wa (mm) | 1.2 | 1.2 | 1.2 | 1.2 | 1.2 | 1.2 |
| Radius Ra of curvature (mm) | 3.0 | 3.0 | 3.0 | 3.0 | 3.0 | 3.0 |
| Ra − Rb (mm) | 2.0 | 2.0 | 2.0 | 2.0 | 2.0 | 2.0 |
| Pitch Pt (mm) | 8.0 | 12.0 | 4.6 | 4.6 | 4.6 | 4.6 |
| Axial distance La (mm) | 2.1 | 2.1 | 0.4 | 1.6 | 2.6 | 5.0 |
| Cornering performance on dry pavement | 7.0− | 7.0− | 7.0 | 7.0 | 7.0 | 7.0− |
| Cornering performance on snowy road | 7.0 | 7.0 | 6.5 | 7.0− | 7.0+ | 7.0+ |
| Critical behavior on snowy road | 7.0− | 6.5+ | 6.5 | 7.0− | 6.5+ | 6.5 |
| Cornering performance on icy road | 7.0− | 7.0− | 6.5 | 7.0− | 7.0+ | 7.0+ |
| Critical behavior on icy road | 7.0− | 6.0 | 6.0 | 7.0− | 6.5 | 6.5− |

The invention claimed is:

1. A pneumatic tire comprising:
a tread portion having a tread surface between its tread edges and provided along each said tread edge with a row of shoulder blocks, wherein said tread edges are axial outermost edges of a ground contacting region of the tire at a camber angle of 0 degrees under a normally inflated loaded condition such that the tire is mounted on a standard wheel rim and inflated to a standard pressure and loaded with a standard tire load; and
the shoulder blocks formed by a circumferentially continuously extending shoulder main groove disposed on each side of the tire equator as an axially outermost main groove and a plurality of shoulder lateral grooves extending from said shoulder main groove to the adjacent tread edge,
wherein
in at least one of the rows of the shoulder blocks, each of the shoulder blocks is provided with:
at least one sipe extending at an angle of not less than 60 degrees with respect to the tire circumferential direction and having a plane inclined with respect to a normal direction to the tread surface;
a chamfered part having a surface being arc-shaped in a tire meridian section and smoothly connecting between the tread surface and a surface of a buttress part; and
at least one protruding part protruding axially outwardly from said surface of the chamfered part, said protruding part having an upper surface extending axially outwardly from said tread edge and a side surface extending radially inwardly from an axially outer end of the upper surface, and
the protruding part has a circumferential width of from 0.5 to 7.0 mm.

2. The pneumatic tire according to claim 1, wherein
said protruding part is provided with a chamfered part smoothly connecting between the upper surface and the side surface of the protruding part, and
the chamfered part of the protruding part has a radius Rb of curvature less than a radius Ra of curvature of the chamfered part of the buttress.

3. The pneumatic tire according to claim 2, wherein
said at least one protruding part is a plurality of protruding parts arranged at a pitch of from 2 to 10 mm in the tire circumferential direction.

4. The pneumatic tire according to claim 2, wherein
said each of the shoulder blocks is provided with a longitudinal sipe, as an axially outermost sipe, extending at an angle of not more than 10 degrees with respect to the tire circumferential direction.

5. The pneumatic tire according to claim 1, wherein
said at least one protruding part is a plurality of protruding parts arranged at a pitch of from 2 to 10 mm in the tire circumferential direction.

6. The pneumatic tire according to claim 5, wherein
said each of the shoulder blocks is provided with a longitudinal sipe, as an axially outermost sipe, extending at an angle of not more than 10 degrees with respect to the tire circumferential direction.

7. The pneumatic tire according to claim 1, wherein
said each of the shoulder blocks is provided with a longitudinal sipe, as an axially outermost sipe, extending at an angle of not more than 10 degrees with respect to the tire circumferential direction.

* * * * *